(12) United States Patent
Miyagi

(10) Patent No.: US 11,831,826 B2
(45) Date of Patent: Nov. 28, 2023

(54) IMAGE READING APPARATUS

(71) Applicant: SEIKO EPSON CORPORATION, Tokyo (JP)

(72) Inventor: Yohei Miyagi, Okinawa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/158,838

(22) Filed: Jan. 24, 2023

(65) Prior Publication Data

US 2023/0239415 A1 Jul. 27, 2023

(30) Foreign Application Priority Data

Jan. 26, 2022 (JP) ................................ 2022-009948

(51) Int. Cl.
*H04N 1/00* (2006.01)

(52) U.S. Cl.
CPC ..... *H04N 1/00575* (2013.01); *H04N 1/00554* (2013.01); *H04N 1/00602* (2013.01)

(58) Field of Classification Search
CPC .............. B65H 3/063; B65H 2511/515; B65H 2801/39; B65H 3/54; B65H 3/0607; B65H 3/0669; B65H 7/18; B65H 1/02; B65H 1/06; B65H 1/14; B65H 2220/01; B65H 2402/46; B65H 2404/1441; B65H 2404/1451; B65H 2405/1116; B65H 2405/1142; B65H 2405/214; B65H 2405/354; B65H 2511/51; B65H 2511/52; B65H 2511/524; B65H 2513/10; B65H 2513/50; B65H 2515/30; B65H 2515/34; B65H 2601/271; B65H 3/0653; B65H 3/0676; B65H 3/66; B65H 3/68; B65H 7/06; B65H 7/12; B65H 9/04; B65H 9/08; B65H 2513/512; B65H 2513/52; B65H 2515/32; B65H 2701/1313; B65H 3/34; B65H 3/5284; B65H 5/062; B65H 7/02; G01N 2800/342; G01N 33/57434; G01N 33/6812; G01N 33/57438; G01N 15/1475; G01N 15/1484; G01N 2015/1006; G01N 2015/1472; G01N 2015/149;

(Continued)

(56) References Cited

U.S. PATENT DOCUMENTS 4,264,067 A * 4/1981 Adams ................. G03B 27/625
271/902
5,918,100 A * 6/1999 Tanaka ..................... B65H 5/38
399/361

(Continued)

FOREIGN PATENT DOCUMENTS

JP 2012-246099 A 12/2012

*Primary Examiner* — Negussie Worku
(74) *Attorney, Agent, or Firm* — WORKMAN NYDEGGER

(57) ABSTRACT

A scanner includes the following. A paper support guides an original document to a supplying port. An inverting unit inverts a front and a back of the original document fed through the supplying port. A reading unit reads the original document before being inverted. A discharging unit discharges the original document after being inverted. A portion of the original document is placed on a placement plate. A pressing unit presses the original document toward the placement plate at least at a downstream end portion in a discharging direction of the original document on the placement plate.

15 Claims, 12 Drawing Sheets

(58) Field of Classification Search
CPC ... G01N 2015/1493; G01N 2015/1497; G01N 27/447; G01N 2800/50; G01N 2800/7028; G01N 33/487; G01N 33/49; G01N 33/6806; G01N 2333/4703; G01N 2333/57; G01N 2333/70596; G01N 2333/7158; G01N 2560/00; G01N 33/574; G01N 3/57415; G01N 33/57423; G01N 33/57488; G01N 33/84; H04N 1/00602; H04N 1/00588; H04N 1/00615; H04N 1/00628; H04N 2201/0081; H04N 1/00578; G06T 7/0016; G16B 20/00; G16B 99/00; G16H 50/20; C07K 14/47; C12N 15/09; C12N 15/113; C12Q 1/02; C12Q 1/68; C12Q 1/6804
USPC .......................................................... 358/498
See application file for complete search history.

(56) References Cited

U.S. PATENT DOCUMENTS

| | | | |
|---|---|---|---|
| 2007/0286657 A1* | 12/2007 | Nagao | G03G 15/6552 |
| | | | 399/405 |
| 2011/0310445 A1* | 12/2011 | Ishizuka | H04N 1/00588 |
| | | | 358/498 |
| 2019/0306350 A1* | 10/2019 | Miwa | B65H 29/50 |
| 2019/0306352 A1* | 10/2019 | Miwa | B65H 31/02 |
| 2020/0071100 A1* | 3/2020 | Namiki | B65H 3/0607 |
| 2023/0094383 A1* | 3/2023 | Miyagi | H04N 1/00602 |
| | | | 358/498 |

\* cited by examiner

IMAGE READING APPARATUS

The present application is based on, and claims priority from JP Application Serial Number 2022-009948, filed Jan. 26, 2022, the disclosure of which is hereby incorporated by reference herein in its entirety.

BACKGROUND

1. Technical Field

The present disclosure relates to an image reading apparatus.

2. Related Art

An image reading apparatus according to JP 2012-246099 A includes a tray on which a sheet is placed, a cover portion in which an opening that serves as an intake port for the sheet is formed, a U-shaped transport path through which the sheet is transported, an image sensor that reads information of the sheet, and a paper discharging roller pair that discharges the sheet, and a paper discharging tray. The sheet transported through the opening from the tray to the U-shaped transport path is sandwiched by the paper discharging roller pair, and discharged to the paper discharging tray.

The configuration including an inverting unit such as the U-shaped transport path of JP 2012-246099 A has a layout in which an original document support portion that supports a supplied original document and a placement portion of the discharged original document are close to each other. For this reason, there is a possibility that a downstream end in a discharging direction of the original document discharged to the placement portion enters a supplying port through which the original document is supplied.

SUMMARY

In order to solve the above-mentioned problems, an image reading apparatus according to the present disclosure includes an original document support portion configured to support an original document and guide the original document to a supplying port of an apparatus main body, an inverting unit configured to invert a front and a back of the original document supplied through the supplying port, a reading unit configured to read the original document before being inverted by the inverting unit, a discharging unit configured to discharge the original document after being inverted by the inverting unit, a placement portion on which a portion of the original document discharged in a discharging direction from the discharging unit is placed, and a presser configured to press the original document toward the placement portion at least at a downstream end portion in the discharging direction of the placement portion.

DESCRIPTION OF EXEMPLARY EMBODIMENTS

Figure 1:
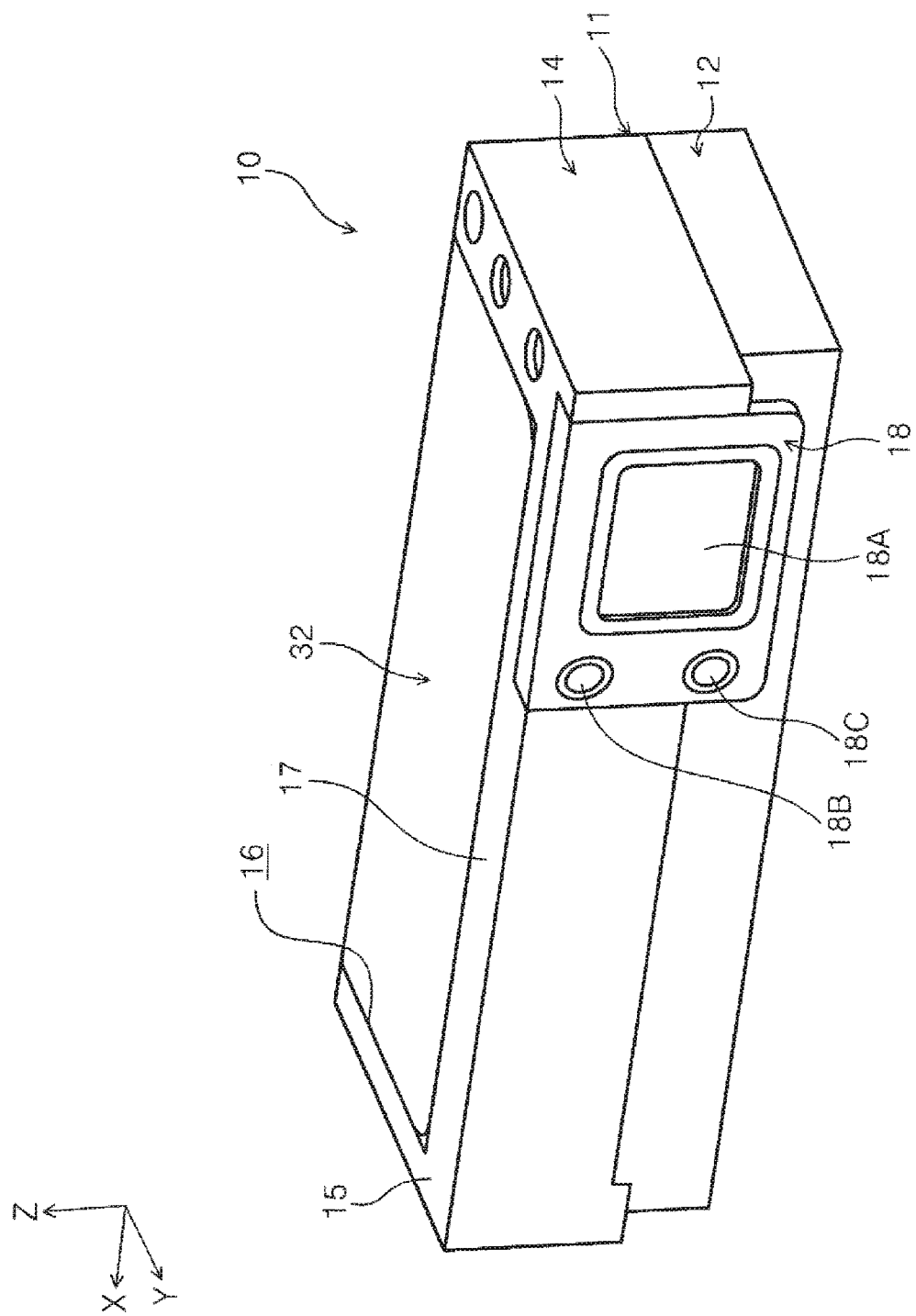
FIG. 1 is a perspective view illustrating an entire scanner according to Exemplary Embodiment 1.

Hereinafter, the present disclosure will be schematically described. An image reading apparatus according to a first aspect includes an original document support portion configured to support an original document and guide the original document to a supplying port of an apparatus main body, an inverting unit configured to invert a front and a back of the original document supplied through the supplying port, a reading unit configured to read the original document before being inverted by the inverting unit, a discharging unit configured to discharge the original document after being inverted by the inverting unit, a placement portion on which a portion of the original document discharged in a discharging direction from the discharging unit is placed, and a presser configured to press the original document toward the placement portion at least at a downstream end portion in the discharging direction of the placement portion.

According to the present aspect, the original document supported by the original document support portion is supplied to an inside of the apparatus main body through the supplying port. The original document supplied is read in the reading unit, and then the front and the back are inverted by the inverting unit. The original document in which the front and the back are inverted is discharged from the discharging unit and placed on the placement portion. Here, when, in the placement portion, a downstream portion in the discharging direction of the original document is deformed so as to hang due to self-weight, the presser presses the downstream portion toward the placement portion before the downstream portion protrudes from the placement portion. As a result, posture of the original document is corrected so that a deformation amount due to the self-weight of the downstream portion decreases, and the downstream portion moves away from the supplying port, so even when a portion of the original document protrudes from the placement portion, it is possible to prevent the original document from entering the supplying port.

An image reading apparatus according to a second aspect is the first aspect, wherein the placement portion includes a first placement surface and a second placement surface on which the original document is placed, the first placement surface is positioned downstream in the discharging direction and above in a vertical direction with respect to the second placement surface, and a first angle formed by the first placement surface and a horizontal direction is greater than a second angle formed by the second placement surface and the horizontal direction. According to the present aspect, the first placement surface is positioned downstream in the discharging direction and above in the vertical direction with respect to the second placement surface. Here, in the placement portion, the posture of the original document is inclined posture facing upward in the vertical direction toward downstream in the discharging direction due to the first angle being greater than the second angle. Accordingly, since the original document is separated from the supplying port, it is possible to prevent a downstream end portion of the original document protruding from the placement portion from entering the supplying port.

An image reading apparatus according to a third aspect is the first aspect or the second aspect, wherein the presser includes an extending member extending along the discharging direction, and a downstream end portion in the discharging direction of the extending member presses the original document. According to the present aspect, as compared to a configuration in which the original document is pressed using a member extending in a direction intersecting the discharging direction, a contact area in the discharging direction between the presser and the original document can be increased, and thus the posture of the original document is easily corrected.

An image reading apparatus according to a fourth aspect is the third aspect, wherein the discharging unit includes a discharging roller pair formed by a first discharging roller rotated about an axis along a width direction intersecting the discharge direction of the original document, and a second discharging roller including a shaft portion positioned opposite to the placement portion with respect to the first discharging roller, and forming a nipping portion for nipping the original document together with the first discharging roller, and an upstream end portion in the discharging direction of the extending member is rotatably coupled to the shaft portion of the second discharging roller. According to the present aspect, the upstream end portion of the extending member is rotatably coupled to the shaft portion, and the extending member is supported by the second discharging roller, and thus posture of the extending member is stable. Further, since the extending member is supported by the second discharging roller, and the extending member can be disposed at a place near the nipping portion, the original document discharged from the nipping portion before being placed can be prevented from being deformed in a direction retracted from the placement portion.

An image reading apparatus according to a fifth aspect is the fourth aspect, wherein the extending member is detachably provided at the shaft portion. According to the present aspect, it is possible to easily replace the extending member.

An image reading apparatus according to a sixth aspect is the fourth aspect or the fifth aspect, wherein the discharging unit includes the two discharging roller pairs positioned on one side and another side with respect to a center in the width direction of the original document, and the presser presses a central portion in the width direction of the original document. According to the present aspect, the presser is at a position to press the central portion in the width direction of the original document, and thus, the original document can be pressed even when a size in the width direction of the original document is changed.

An image reading apparatus according to a seventh aspect is any one of the fourth to the sixth aspects including an imparting unit provided downstream in the discharging direction with respect to the nipping portion, and configured to impart transport force to the original document, wherein the imparting unit presses the original document discharged from the nipping portion toward an outer peripheral surface of the first discharging roller. According to the present aspect, pressing force acts on the original document discharged from the nipping portion, from the imparting unit toward the outer peripheral surface. Then, reaction force to friction force generated in accordance with the pressing force is imparted to the original document as the transport force. As a result, even when the transport force for the original document is reduced due to the discharge from the nipping portion, the original document is continuously transported by the transport force imparted by the imparting unit, and thus the original document can be prevented from remaining at the discharging roller pair.

An image reading apparatus according to an eighth aspect is the seventh aspect provided with a supporting member configured to support the imparting unit, wherein the supporting member is provided with a guide surface for guiding the original document discharged from the nipping portion to between the imparting unit and the outer peripheral surface. According to the present aspect, the imparting unit and the guide surface are provided at the supporting member, and a relative position shift between a position of the imparting unit and a position of the guide surface is suppressed, and thus the original document discharged from the nipping portion can be easily guided to between the imparting unit and the outer peripheral surface.

An image reading apparatus according to a ninth aspect is the eighth aspect, wherein the supporting member is detachably provided at the apparatus main body. According to the present aspect, it is possible to easily replace and clean the supporting member and the imparting unit.

An image reading apparatus according to a tenth aspect is the eighth aspect or the ninth aspect, wherein the imparting unit includes a driven rotating body rotatably supported by the supporting member, and rotating along with rotation of the first discharging roller. According to the present aspect, it is possible to prevent excessive friction force from acting on the original document while ensuring the transport force, as compared to a configuration in which the imparting unit does not rotate.

An image reading apparatus according to an eleventh aspect is any one of the first aspect to the tenth aspect, wherein the presser includes a rotating body contacting the original document and rotating along with movement of the original document. According to the present aspect, when the original document is moved in the discharging direction while the rotating body presses the original document, the rotating body is rotated. As a result, friction force acting between the original document and the rotating body is reduced, and thus wear of the original document can be reduced, as compared to a configuration in which the rotating body is not rotated.

An image reading apparatus according to a twelfth aspect is any one of the first aspect to the eleventh aspect, wherein the presser includes at least one hinge portion rotating about an axis along a width direction intersecting the discharging direction of the original document. According to the present aspect, a downstream portion in the discharging direction of the presser from the hinge portion is rotatable with respect to an upstream portion. As a result, posture of the downstream portion of the presser can be changed, and a contact area between the downstream portion of the presser and the original document can be increased, and thus the original document can be curved such that the original document is not directed toward the supplying port.

An image reading apparatus according to a thirteenth aspect is the twelfth aspect, wherein the hinge portion is provided such that the posture of the downstream portion in the discharging direction in the presser is aligned with posture of the downstream end portion of the placement portion. According to the present aspect, a contact area between the downstream portion of the presser and the original document can be increased as compared to a configuration in which the posture of the downstream portion in the discharging direction from the hinge portion in the presser is different from the posture of the downstream end portion of the placement portion.

An image reading apparatus according to a fourteenth aspect is the twelfth aspect or the thirteenth aspect, wherein the hinge portion includes an upstream hinge portion provided at an upstream portion from a center in the discharging direction of the presser. According to the present aspect, in the presser, the upstream hinge portion is provided at the upstream portion that is less likely to affect correction of posture of the original document as compared to a downstream portion. Accordingly, when a position of the downstream end portion of the presser is adjusted in the discharging direction, by rotating the upstream hinge portion, the adjustment can be easily performed.

An image reading apparatus according to a fifteenth aspect is the fourteenth aspect, wherein the apparatus main body is provided with an opening portion exposing the placement portion, the original document support portion is provided at the apparatus main body so as to be capable of opening and closing the opening portion, and the upstream hinge portion is rotated by the original document support portion contacting the presser, when the original document support portion closes the opening portion. According to the present aspect, in accordance with operation of closing the opening portion by the original document support portion, the upstream hinge portion is rotated by the original document support portion contacting the presser, and thus the upstream hinge portion need not be manually operated.

Exemplary Embodiment 1

As illustrated in FIG. 1, a scanner 10 of Exemplary Embodiment 1 will be specifically described. The scanner 10 is an example of an image reading apparatus that reads an original document G (FIG. 2), which is an example of a medium. The scanner 10 includes a lower cover 12, an upper cover 14, an operation unit 18, and a paper support 32 described below, constituting an outline. Note that, the lower cover 12 and the upper cover 14, and a skeleton member (not illustrated) provided inside the lower cover 12 and the upper cover 14 collectively form an apparatus main body 11. An X-Y-Z coordinate system illustrated in each figure is an orthogonal coordinate system. A surface at which the operation unit 18 is positioned is a front face of the scanner 10.

Figure 2:
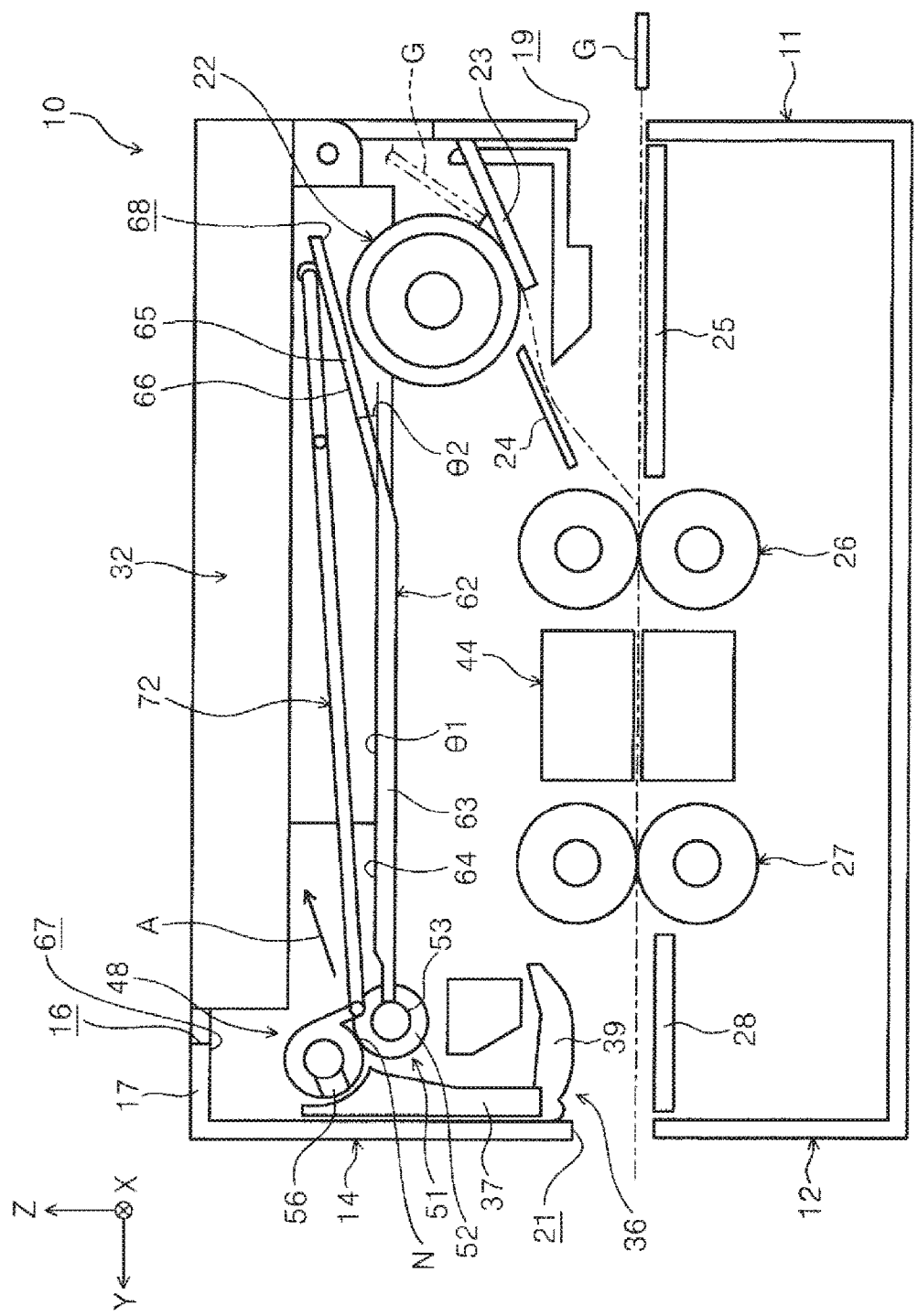
FIG. 2 is a schematic view of the scanner according to Exemplary Embodiment 1 as viewed from one side in a width direction.

An X direction is an apparatus width direction in which the scanner 10 is viewed from the front face, and is a horizontal direction. In addition, the X direction is a width direction intersecting a discharging direction described below of the original document G (FIG. 2). In the X direction, a direction facing left is a +X direction, and a direction facing right is a −X direction. A Y direction is an apparatus depth direction, and is a horizontal direction. A direction facing forward in the Y direction is a +Y direction, and a direction facing backward is a −Y direction. A Z direction is an apparatus height direction, and, as an example, is a vertical direction. A direction facing upward in the Z direction is a +Z direction, and a direction facing downward is a −Z direction.

As illustrated in FIG. 2, in a discharging roller pair 51 described later, a direction in which the original document G is discharged is a +A direction. That is, the +A direction is an example of the discharging direction. The +A direction is a direction from a nipping portion N of the discharging roller pair 51 where the original document G is nipped, to a position in the −Y direction and the +Z direction. The original document G is discharged from the nipping portion N of the discharging roller pair 51 in the +A direction. A direction opposite to the direction +A is a −A direction. The +A direction and the −A direction are orthogonal to the X direction.

As illustrated in FIG. 1, the scanner 10 is formed in a rectangular parallelepiped shape in which a dimension in the X direction is longer than a dimension in the Y direction as viewed from the Z direction. The lower cover 12 constitutes a lower portion of the scanner 10. The upper cover 14 is positioned in the +Z direction with respect to the lower cover 12, and constitutes an upper portion of the scanner 10. The upper cover 14 includes an upper wall 15 that constitutes an end portion in the +Z direction of the upper cover 14.

The upper wall 15 is formed in a plate shape that extends along an X-Y plane. Additionally, an opening portion 16 that opens in the −Y direction as viewed from the Z direction is formed in the upper wall 15. That is, the apparatus main body 11 is provided with the opening portion 16 that exposes a placement table described below. A site in the +Y direction of the upper wall 15 with respect to the opening portion 16 is an edge portion 17.

The opening portion 16 is in one state of an open state and a closed state by the paper support 32 described below being rotated. In the following description, a state in which the paper support 32 closes the opening portion 16 is the closed state of the scanner 10. A state in which the paper support 32 opens the opening portion 16 is the open state of the scanner 10.

As an example, the operation unit 18 includes a touch panel 18A, operation buttons 18B and 18C. The operation unit 18 can transmit and receive signals with a control unit (not illustrated). The operation unit 18 is rotatably provided at the upper cover 14 via a hinge portion (not illustrated). In the touch panel 18A, display and input of information related to an operation of the scanner 10 are performed. The operation buttons 18B and 18C are assigned as ON, OFF switches of a power source of the scanner 10, or the like.

As illustrated in FIG. 2, an insertion port 19 and a lower discharging port 21 are provided between a portion of the lower cover 12 and a portion of the upper cover 14. The insertion port 19 is provided at an end portion in the −Y direction of the scanner 10. The lower discharging port 21 is provided at an end portion in the +Y direction of the scanner 10. The insertion port 19 and the lower discharging port 21 are positioned at approximately the same height in the +Z direction. By a user inserting the original document G in the +Y direction with respect to the insertion port 19, the original document G is supplied to an inside of the apparatus main body 11. Further, the original document G can be discharged from the lower discharging port 21 in the +Y direction.

As an example, the scanner 10 includes the paper support 32, an inverting unit 36, a reading unit 44, a discharging unit 48, a placement plate 62, and a pressing unit 72. Furthermore, the scanner 10 includes a feeding roller 22, a separation pad 23, an upper guide 24, a lower guide 25, a transport roller pair 26, a transport roller pair 27, and a lower guide 28.

The feeding roller 22 is at a position in the −Y direction and the +Z direction with respect to a center of the scanner 10. The feeding roller 22 is provided so as to be rotatable about an axis extending in the X direction. The separation pad 23 is at a position in the −Y direction and the −Z direction with respect to a center of the feeding roller 22. The separation pad 23 causes force toward an outer peripheral surface of the feeding roller 22 to act on the original document G, and thus handles the original document G by frictional force.

The upper guide 24 guides the original document G fed by the feeding roller 22 downstream in a feeding direction. The lower guide 25 is positioned in the −Z direction with respect to the upper guide 24. The lower guide 25 supports the original document G inserted from the insertion port 19 and guides the original document G in the +Y direction. The lower guide 28 is positioned in the +Y direction with respect to the transport roller pair 27. The lower guide 28 extends in the +Y direction to the lower discharging port 21, and supports the original document G. Note that, a path from the insertion port 19 to the lower discharging port 21 is used when the original document G is transported linearly.

The transport roller pair 26 is positioned in the +Y direction with respect to the upper guide 24 and the lower guide 25.

Figure 6:
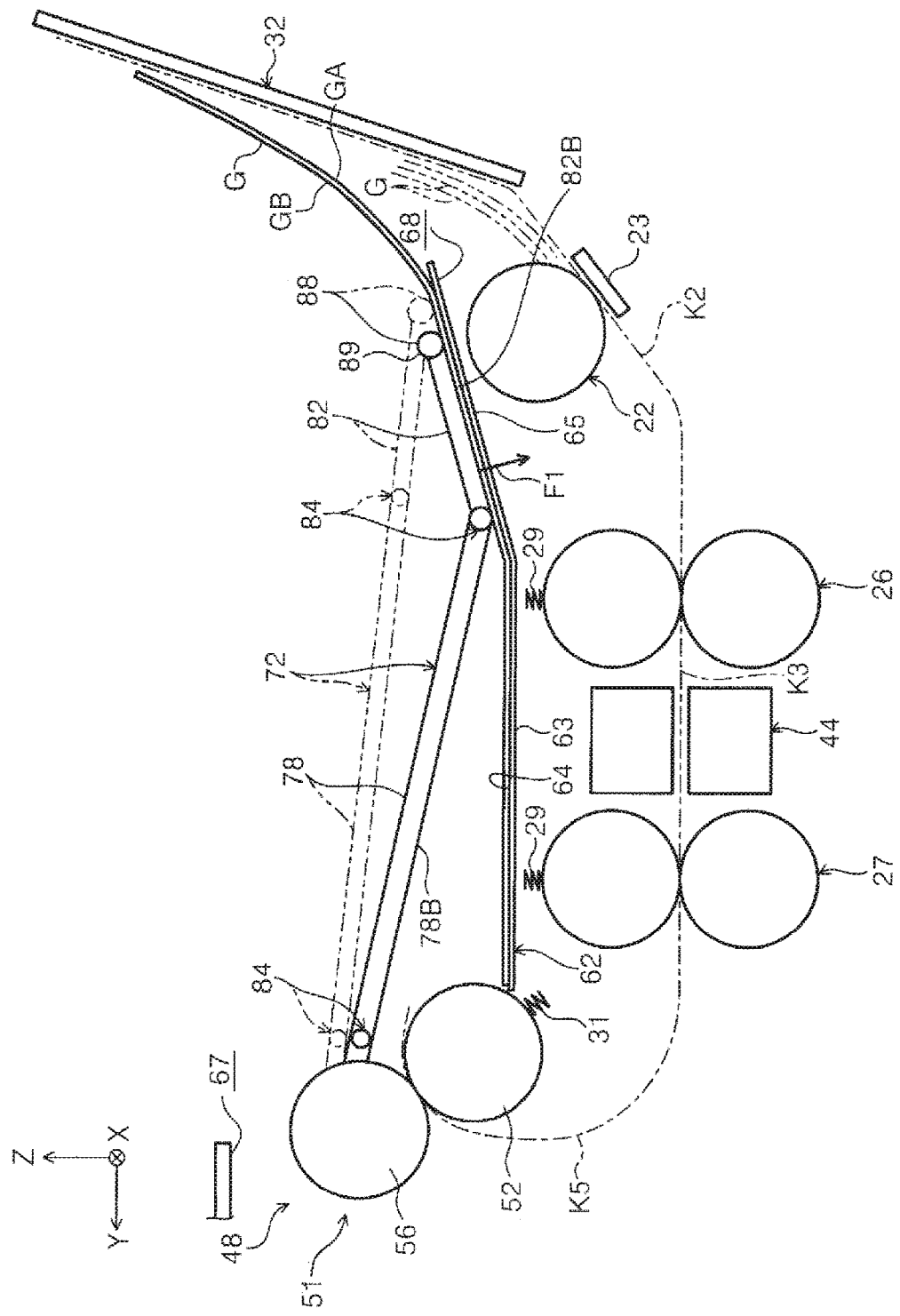
FIG. 6 is a schematic view illustrating a state where an original document discharged from a transport path is pressed by the pressing unit in the scanner according to Exemplary Embodiment 1.

The transport roller pair 26 is provided so as to be rotatable about an axis extending in the X direction. The transport roller pair 26 transports the original document G in the +Y direction. Note that, the reading unit 44 is positioned in the +Y direction with respect to the transport roller pair 26. The transport roller pair 27 is positioned in the +Y direction with respect to the reading unit 44. The transport roller pair 27 is provided so as to be rotatable about an axis extending in the X direction. The transport roller pair 27 transports the original document G in the +Y direction. The transport roller pairs 26 and 27 are imparted with elastic force in the −Z direction by springs 29 (FIG. 6).

Figure 3:
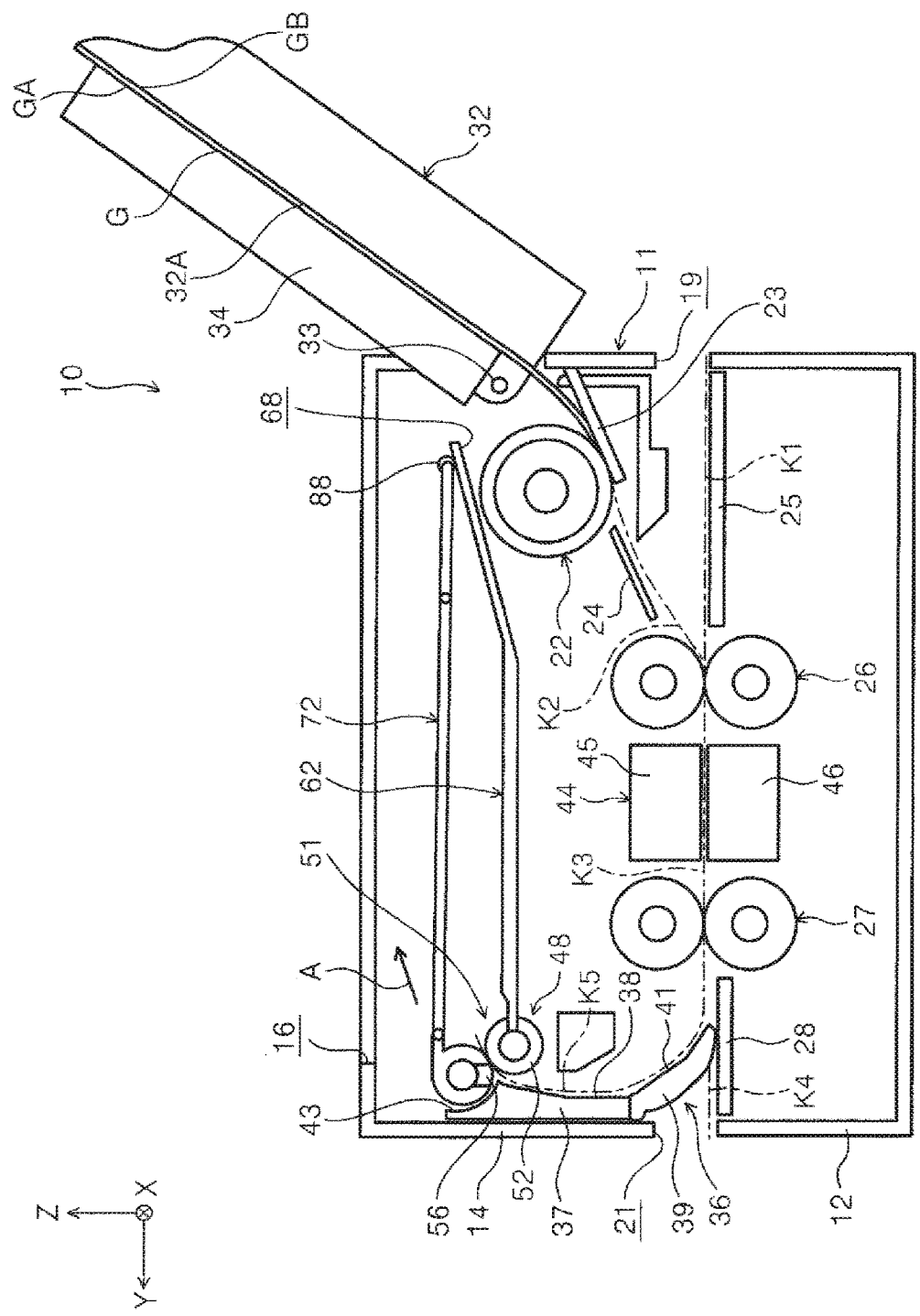
FIG. 3 is a schematic view illustrating a state where a paper support is rotated to an opening position in the scanner according to Exemplary Embodiment 1.

As illustrated in FIG. 3, the paper support 32 is an example of an original document support portion that supports the original document G. The paper support 32 guides the original document G to a supplying port 68 described below of the apparatus main body 11. Specifically, the paper support 32 is formed in a plate shape having a size that allows placement of the original document G. In the paper support 32, a surface on which the original document G is placed is a placement surface 32A.

An end portion in the −Z direction of the paper support 32 is rotatably coupled to a portion of the apparatus main body 11 via a rotational shaft 33. The paper support 32 is rotatable to a closing position to close the opening portion 16 and an opening position to open the opening portion 16. That is, the paper support 32 is provided at the apparatus main body 11 so as to be capable of opening and closing the opening portion 16. The paper support 32 constitutes an upper portion in the +Z direction of the upper cover 14 at the closing position. The paper support 32 is disposed at the opening position in an inclined state of being lowering in the −Z direction toward the +Y direction, and the original document G is placed.

The paper support 32 includes a pair of edge guides 34 aligned in the X direction, and a rack-and-pinion (not illustrated). Note that in FIG. 3, the edge guide 34 in the −X direction is omitted. The pair of edge guides 34 are provided so as to be movable in a direction for mutually approaching or separating along the X direction. Then, the pair of edge guides 34 align positions of both ends in the X direction of the original document G placed on the placement surface 32A. The rack-and-pinion (not illustrated) causes the pair of edge guides 34 to interlock.

The inverting unit 36 is positioned in the +Y direction with respect to the transport roller pair 27 and in the +Z direction with respect to the lower guide 28. The inverting unit 36 is a site where a front and a back of the original document G supplied through the supplying port 68 described below are inverted. As an example, the inverting unit 36 includes a guide frame 37 and a flap 39. Each of the guide frame 37 and the flap 39 is a member that is longer than a width of the original document G and extends in the X direction.

The guide frame 37 is positioned in the −Y direction with respect to an end portion in the +Y direction of the upper cover 14.

The guide frame 37 extends in the +Z direction. A guiding surface 38 is provided at an end portion in the −Y direction of the guide frame 37. A notch portion 43 is provided at an end portion in the +Z direction of the guide frame 37. The guiding surface 38 is a curved surface recessed in the +Y direction, and guides the original document G to the discharging unit 48 described below. The notch portion 43 is a cut-out site so as not to contact the second discharging roller 56 described later of the discharging unit 48.

The flap 39 is a member curved in an arc shape as viewed from the X direction, as an example. A surface positioned in the −Y direction of the flap 39 is a guiding surface 41. The guiding surface 41 is a curved surface formed so as to be convex toward the lower discharging port 21. An end portion in the +Z direction of the flap 39 is rotatably coupled to an end portion in the −Z direction of the guide frame 37. The flap 39 is rotatable about an axis along the X direction.

The flap 39 is rotated by a motor and a gear (not illustrated). A position where the flap 39 approaches the lower guide 28 is an inversion position. A position where the flap 39 is retracted in the +Z direction with respect to the lower guide 28 is a straight position. Here, when the flap 39 is at the inversion position, the front and the back are inverted by the original document G being guided by the guiding surface 38 and the guiding surface 41. Note that, the flap 39 is retracted from the lower guide 28 at the straight position. At this time, the original document G travels straight in the +Y direction without being inverted, and is discharged from the lower discharging port 21.

The reading unit 44 reads the original document G before being inverted by the inverting unit 36. The reading unit 44 includes a first reading unit 45 and a second reading unit 46 facing in the Z direction. The first reading unit 45 and the second reading unit 46 include close-type image sensor modules (CISM) as an example. The reading unit 44 reads the original document G transported by the transport roller pair 26.

The first reading unit 45 is positioned in the +Z direction with respect to the original document G. The first reading unit 45 reads a front surface GA in the +Z direction of the original document G. Note that, the first reading unit 45 is provided so as to be movable in the +Z direction. The second reading unit 46 is positioned in the −Z direction with respect to the original document G. The second reading unit 46 reads a back surface GB in the −Z direction of the original document G.

The discharging unit 48 discharges the original document G after the front surface GA and the back surface GB are inverted in the inverting unit 36. Specifically, the discharging unit 48 is provided at a position in the −Y direction and the +Z direction with respect to an end portion in the +Z direction of the guiding surface 38. As an example, the discharging unit 48 includes two discharging roller pairs 51 in the X direction each formed by the first discharging roller 52 and the second discharging roller 56.

Figure 4:
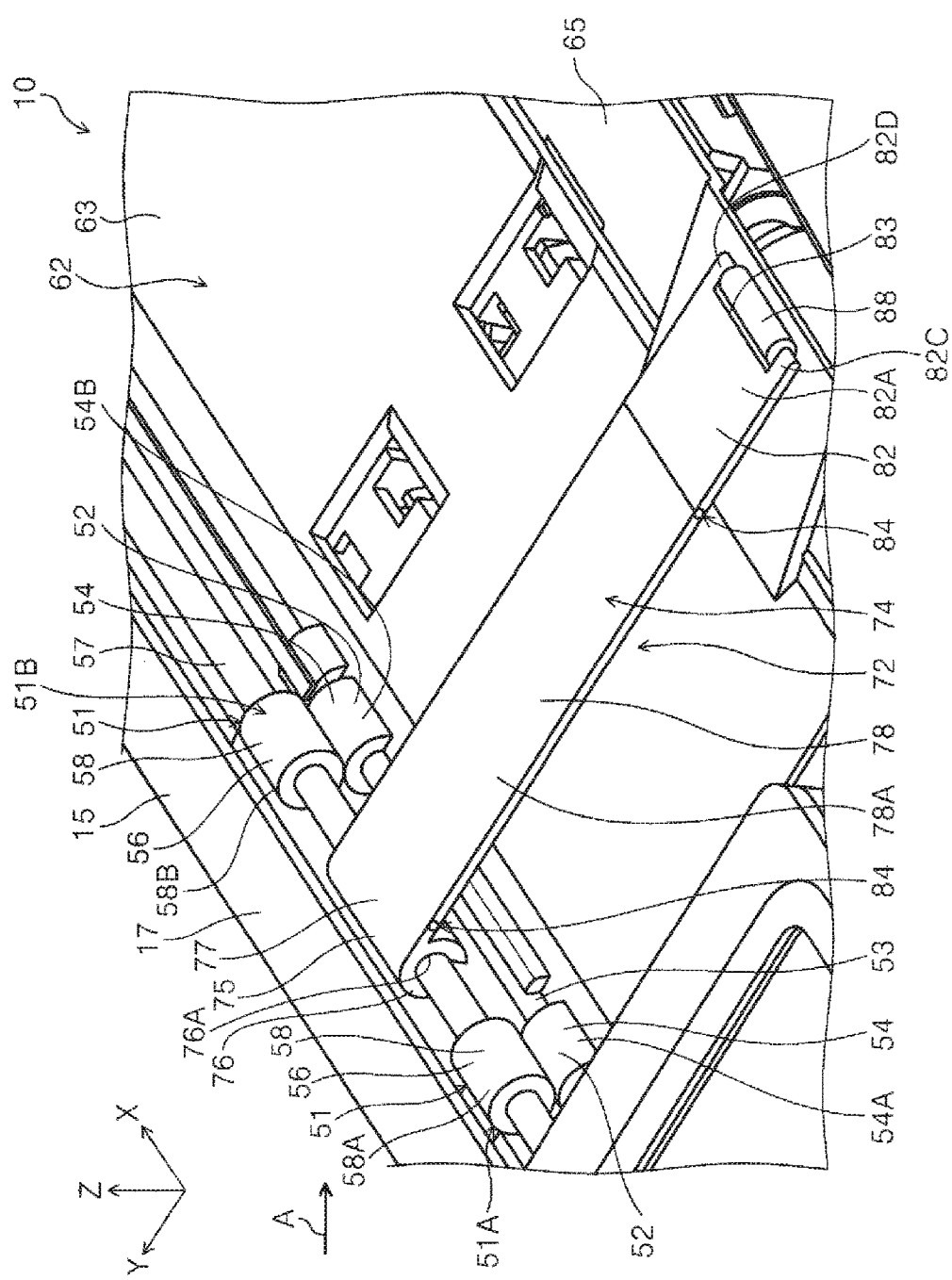
FIG. 4 is a perspective view illustrating a pressing unit and a periphery portion of the pressing unit in the scanner according to Exemplary Embodiment 1.

As illustrated in FIG. 4, the first discharging roller 52 extends in the X direction. The first discharging roller 52 includes, as an example, a cylindrical shaft portion 53 extending in the X direction, and two cylindrical roller main body portions 54 provided at an interval in the X direction at an outer peripheral surface of the shaft portion 53. That is, the first discharging roller 52 is a roller capable of rotating about the shaft portion 53 along the X direction. Of the two roller main body portions 54, the roller main body portion 54 in the −X direction is a roller main body portion 54A, and the roller main body portion 54 in the +X direction is a roller main body portion 54B. The first discharging roller 52 is a driven roller that is rotated with rotation of the second discharging roller 56 described later. The first discharging roller 52 is imparted with elastic force by a spring 31 (FIG. 6) toward the second discharging roller 56.

The second discharging roller 56 is rotated about an axis along the X direction. The second discharging roller 56 includes, as an example, a cylindrical shaft portion 57 as an example of a shaft extending along the X direction, and two cylindrical roller main body portions 58 provided at an interval in the X direction at an outer peripheral surface of the shaft portion 57. That is, the second discharging roller 56 is a roller that is rotatable about the shaft portion 57 along the X direction. The shaft portion 57 is at a position in the +Y direction and the +Z direction with respect to the first discharging roller 52. In other words, the shaft portion 57 is positioned opposite to the placement plate 62 described later in the Z direction with respect to the first discharging roller 52.

Of the two roller main body portions 58, the roller main body portion 58 in the −X direction is a roller main body portion 58A, and the roller main body portion 58 in the +X direction is a roller main body portion 58B. The second discharging roller 56 forms the nipping portion N (FIG. 2), which is a site nipping the original document G, together with the first discharging roller 52. The second discharging roller 56 is a driving roller that is rotated by a motor and a gear (not illustrated) as an example.

Of the two discharging roller pairs 51, the discharging roller pair 51 in the −X direction is a discharging roller pair 51A, and the discharging roller pair 51 in the +X direction is a discharging roller pair 51B. That is, the two discharging roller pairs 51 include the discharging roller pair 51A and the discharging roller pair 51B, which are positioned on one side and another side with respect to a center in the X direction of the original document G. Note that, the discharging roller pair 51A includes the shaft portion 53, the shaft portion 57, the roller main body portion 54A, and the roller main body portion 58A. The discharging roller pair 51B includes the shaft portion 53, the shaft portion 57, the roller main body portion 54B, and the roller main body portion 58B.

As illustrated in FIG. 2, the placement plate 62 is an example of a placement portion on which a portion of the original document G discharged in the +A direction from the discharging unit 48 is placed. The placement plate 62 is formed in a plate shape having a predetermined thickness in the Z direction. The placement plate 62 extends from the shaft portion 53 in the −Y direction. A dimension in the X direction of the placement plate 62 is longer than a dimension in the Y direction. As an example, the placement plate 62 includes an upstream plate portion 63 and a downstream plate portion 65.

As an example, the upstream plate portion 63 extends along the −Y direction from the shaft portion 53 and extends along the X direction. That is, the upstream plate portion 63 is disposed substantially horizontally. The upstream plate portion 63 is positioned in the +Z direction with respect to the transport roller pair 26, the reading unit 44, and the transport roller pair 27. An upper surface 64 in the +Z direction of the upstream plate portion 63 is substantially planar along the X-Y plane. The upper surface 64 is an example of a first placement surface on which the original document G is placed. An upper discharging port 67 is formed between an end portion in the +Y direction of the upstream plate portion 63 and an end portion in the −Y direction of the edge portion 17. The upper discharging port 67 is a space through which the original document G passes when being discharged from the discharging unit 48 toward the placement plate 62.

A direction along the placement plate 62, that is, a direction in which the placement plate 62 extends is also an example of the discharging direction.

As an example, the downstream plate portion 65 extends from an end portion in the −Y direction of the upstream plate portion 63 toward a position in the −Y direction and in the +Z direction, and extends along the X direction. That is, the downstream plate portion 65 is positioned downstream in the −Y direction with respect to the upstream plate portion 63. Furthermore, the downstream plate portion 65 is disposed in a state of being inclined in an intersecting direction intersecting the horizontal direction. The downstream plate portion 65 is positioned in the +Z direction with respect to the upper guide 24 and the feeding roller 22. An inclined surface 66 is formed at an end portion in the +Z direction of the downstream plate portion 65. The inclined surface 66 is substantially planar inclined in the intersecting direction. The inclined surface 66 is an example of a second placement surface on which the original document G is placed. In this way, the placement plate 62 includes the upper surface 64 and the inclined surface 66.

The inclined surface 66 is positioned downstream in the +A direction and above in the +Z direction with respect to the upper surface 64. A second angle $\theta 2(°)$ formed by the inclined surface 66 and the Y direction is greater than a first angle) $\theta 1(°)$ formed by the upper surface 64 and the Y direction. Note that, the first angle $\theta 1$ is set to approximately $0(°)$ as an example.

The supplying port 68 is formed between an end portion in the −Y direction of the downstream plate portion 65, and a site positioned in the −Y direction from the feeding roller 22 in the separation pad 23. The supplying port 68 is a space through which the original document G passes when being supplied toward the feeding roller 22. Also, the supplying port 68 is positioned in the −Z direction with respect to the downstream plate portion 65, and is positioned facing the feeding roller 22. Thus, in a state where the original document G is placed on the paper support 32 at the opening position, an end portion in the −Z direction of the original document G is supplied to the feeding roller 22 through the supplying port 68.

Each of paths through which the original document G is fed, transported, and discharged will be described. As illustrated in FIG. 3, a path extending in the Y direction from the insertion port 19 to the transport roller pair 26 is a first path K1. A path from the paper support 32, through the supplying port 68, the separation pad 23, the feeding roller 22, and the upper guide 24 to a joint to the first path K1 is a second path K2. A path from the transport roller pair 26 through the reading unit 44 and the transport roller pair 27 to an end portion in the −Y direction of the lower guide 28 is a third path K3. A path from a central portion in the Y direction of the lower guide 28 to the lower discharging port 21 is a fourth path K4. A path from the central portion in the Y direction of the lower guide 28 to the upper discharging port 67 is a fifth path K5. The original document G is guided by the guiding surfaces 41 and 38 in the fifth path K5 and discharged from the discharging unit 48, so that the front surface GA and the back surface GB are inverted.

Figure 5:
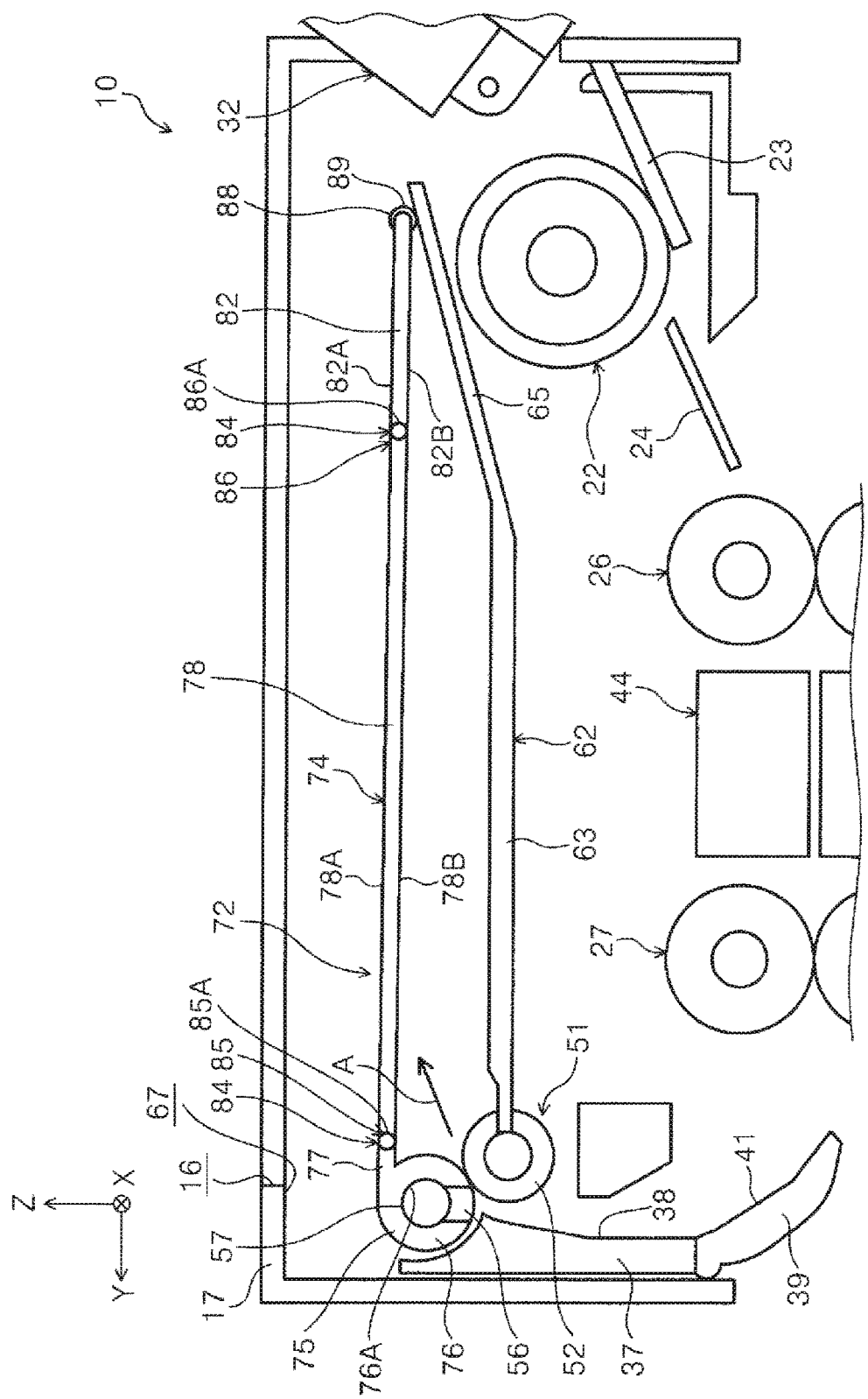
FIG. 5 is a schematic view of an upper portion of the scanner according to Exemplary Embodiment 1 as viewed from one side in the width direction.

As illustrated in FIG. 4 and FIG. 5, the pressing unit 72 is an example of a presser for pressing the original document G toward the placement plate 62 at least at a downstream end portion in the +A direction of the placement plate 62. The pressing unit 72 includes an extending member 74 extending along the +A direction, and a rotary member 88 provided at the extending member 74, as an example. The pressing unit 72 presses a central portion in the X direction of the original document G toward the placement plate 62.

A direction along the extending member 74, that is, a direction in which the extending member 74 extends, is also an example of the discharging direction.

As an example, the extending member 74 includes a coupling portion 75, a first plate portion 78, a second plate portion 82, and two hinge portions 84. In the extending member 74, a downstream end portion in the +A direction of the second plate portion 82 presses the original document G against the placement plate 62. In the extending member 74, the coupling portion 75 as an upstream end portion in the +A direction is rotatably coupled to the shaft portion 57 of the second discharging roller 56. In the extending member 74, the coupling portion 75 is detachably provided at the shaft portion 57.

As an example, the coupling portion 75 is a site in which a removeably attachable portion 76 and an arm portion 77 are integrally formed. The removeably attachable portion 76 is a site where a portion in a circumferential direction of a cylinder having a central axis along the X direction is cut out. In other words, the removeably attachable portion 76 is formed in a C-shape as viewed from the X direction. A diameter of an inner peripheral surface 76A of the removeably attachable portion 76 is greater than an outer diameter of the shaft portion 57. In addition, the site cut out in the removeably attachable portion 76 can elastically deform in the circumferential direction. As a result, the removeably attachable portion 76 can be mounted to and removed from the shaft portion 57 in a radial direction of the shaft portion 57. The arm portion 77 is a plate-like portion extending in a tangential direction from a portion in the circumferential direction of the removeably attachable portion 76. A cylindrical linking portion (not illustrated) is provided at an end portion of the arm portion 77 opposite to the removeably attachable portion 76. As an example, a dimension in the tangential direction of the arm portion 77 is shorter than a dimension of an outer diameter of the removeably attachable portion 76.

A dimension in the X direction of the coupling portion 75 is shorter than a dimension corresponding to an interval in the X direction between the two discharging roller pairs 51. That is, the coupling portion 75 can be disposed between the two discharging roller pairs 51.

The coupling portion 75 is not rotated in accordance with rotation of the shaft portion 57, but is rotated when external force acts in the circumferential direction. In this manner, the coupling portion 75 is supported by the shaft portion 57, and can be rotated independent of the rotation of the shaft portion 57.

The first plate portion 78 extends in the +A direction. The first plate portion 78 is formed in a rectangular shape in which a dimension in the +A direction is longer than a dimension in the +X direction as viewed from the Z direction. A dimension of a short side of the first plate portion 78 is approximately equal to the dimension in the X direction of the coupling portion 75. As an example, a dimension of a long side of the first plate portion 78 is longer than a dimension in the Y direction of the upstream plate portion 63, and is shorter than a dimension in the Y direction of the placement plate 62. A linking portion (not illustrated) is provided at an end portion in each of the −A direction and the +A direction of the first plate portion 78. The linking portion (not illustrated) is formed in a cylindrical shape having a central axis along the X direction. An upper surface 78A in the +Z direction and a lower surface 78B in the −Z direction of the first plate portion 78 are both flat surfaces.

The second plate portion 82 extends in the +A direction. The second plate portion 82 is formed in a rectangular shape in which a dimension in the +A direction is longer than a dimension in the +X direction as viewed from the Z direction. A dimension of a short side of the second plate portion 82 is approximately equal to a dimension in the X direction of the first plate portion 78. As an example, a dimension of a long side of the second plate portion 82 is shorter than a dimension in the Y direction of the downstream plate portion 65. A linking portion (not illustrated) is provided at an end portion in the −A direction of the second plate portion 82. The linking portion (not illustrated) is formed in a cylindrical shape having a central axis along the X direction. An upper surface 82A in the +Z direction and a lower surface 82B in the −Z direction of the second plate portion 82 are both flat surfaces.

A notch portion 83 (FIG. 4) is formed at an end portion in the +A direction of the second plate portion 82. The notch portion 83 is a recessed portion that opens in the −Y direction as viewed from the Z direction. A shape of the notch portion 83 is a rectangular shape in which a dimension in the X direction is longer than a dimension in the Y direction. A site positioned in the +X direction with respect to the notch portion 83 at the end portion in the +A direction of the second plate portion 82 is a support plate portion 82C, and a site positioned in the −X direction is a support plate portion 82D.

As illustrated in FIG. 5, the two hinge portions 84 are an example of at least one hinge portion that rotates about an axis along the X direction that intersects the +A direction of the original document G. One hinge portion 84 includes an upstream hinge portion 85 provided upstream a center in the +A direction of the pressing unit 72. Another hinge portion 84 includes a downstream hinge portion 86 provided downstream the center. The upstream hinge portion 85 and the downstream hinge portion 86 are configured as torque hinges that generate torque, by friction force, spring force, or the like. That is, each of the upstream hinge portion 85 and the downstream hinge portion 86 can hold, with respect to a position of one site to couple, a position of another portion, at any opening angle.

The upstream hinge portion 85 includes a cylindrical fixing pin 85A. The fixing pin 85A includes a central axis along the X direction. The fixing pin 85A couples the arm portion 77 of the coupling portion 75 and a linking portion positioned at an end portion in the +Y direction of the first plate portion 78 so as to be rotatable about the central axis. These linking portions are configured as torque hinges. The upstream hinge portion 85 is disposed so as to be rotatable by being contacted with the paper support 32 being moved in the −Z direction, when the paper support 32 closes the opening portion 16.

The downstream hinge portion 86 is provided so as to be capable of being rotated and held such that posture of a downstream portion in the +A direction of the pressing unit 72 is aligned with posture of a downstream end portion of the placement plate 62. Specifically, the downstream hinge portion 86 includes a cylindrical fixing pin 86A. The fixing pin 86A includes a central axis along the X direction. The fixing pin 86A couples a linking portion positioned at an end portion in the −Y direction of the first plate portion 78 and a linking portion positioned at an end portion in the +Y direction of the second plate portion 82 so as to be rotatable about the central axis. These linking portions are configured as torque hinges.

The rotary member 88 is an example of a rotating body that contacts the original document G and rotates with movement of the original document G. The rotary member 88 is formed in a cylindrical shape having an axis along the X direction. Support shafts (not illustrated) are provided at both ends in the X direction of the rotary member 88. The support shafts (not illustrated) are rotatably supported by the support plate portion 82C and the support plate portion 82D (FIG. 4). In this manner, the rotary member 88 is provided so as to freely rotate with respect to the extending member 74 at an end portion in the +A direction of the extending member 74.

A dimension corresponding to a diameter of an outer peripheral surface 89 of the rotary member 88 is greater than a dimension corresponding to a thickness in the Z direction of the second plate portion 82. A portion of the rotary member 88 protrudes from the lower surface 82B in the Z direction.

Next, actions of the scanner 10 of Exemplary Embodiment 1 will be described. Note that, for each configuration of the scanner 10, description of individual figure numbers may be omitted by referring to each of the configurations and reference numerals illustrated in FIG. 1 to FIG. 5. As illustrated in FIG. 3, by rotating the paper support 32 from the closing position to the opening position, the original document G can be placed on the paper support 32.

As illustrated in FIG. 6, the second plate portion 82 is held in posture along the downstream plate portion 65, by being operated by the user. Note that, a dimension corresponding to an interval in the Z direction between the downstream plate portion 65 and the second plate portion 82 is less than a dimension corresponding to a thickness of the original document G. That is, the original document G being discharged travels toward the paper support 32 while at least a portion thereof contacting the lower surface 82B. Note that, a state of the pressing unit 72 before deformation is indicated by two-dot chain lines.

Here, an end portion in the −Z direction of the plurality of original documents G placed on the paper support 32 is inserted into the supplying port 68. One sheet is separated from the plurality of original documents G by the separation pad 23, and is fed by the feeding roller 22. The original document G being fed is transported along the second path K2 and the third path K3, and read by the reading unit 44. The read original document G is transported along the fifth path K5.

The original document G is transported along the fifth path K5, and is discharged from the discharging unit 48 through the upper discharging port 67 to the placement plate 62. A portion of the original document G during discharge is guided toward the placement plate 62 by contacting the lower surface 78B of the first plate portion 78. The original document G contacts the upper surface 64 and is guided in the −Y direction, and enters between the downstream plate portion 65 and the second plate portion 82. Thus, the original document G receives first pressing force F1 of predetermined magnitude toward the downstream plate portion 65.

Furthermore, the original document G is sandwiched between the outer peripheral surface 89 of the rotary member 88 and the downstream plate portion 65, and thus receives second pressing force F2 (FIG. 7) of predetermined magnitude from the rotary member 88. As a result, the original document G is corrected (curved) so as to be wound around a portion in a circumferential direction of the outer peripheral surface 89. In other words, the original document G travels toward the paper support 32 so as to be separated from the supplying port 68 at an end portion position in the −Y direction of the downstream plate portion 65.

Figure 7:
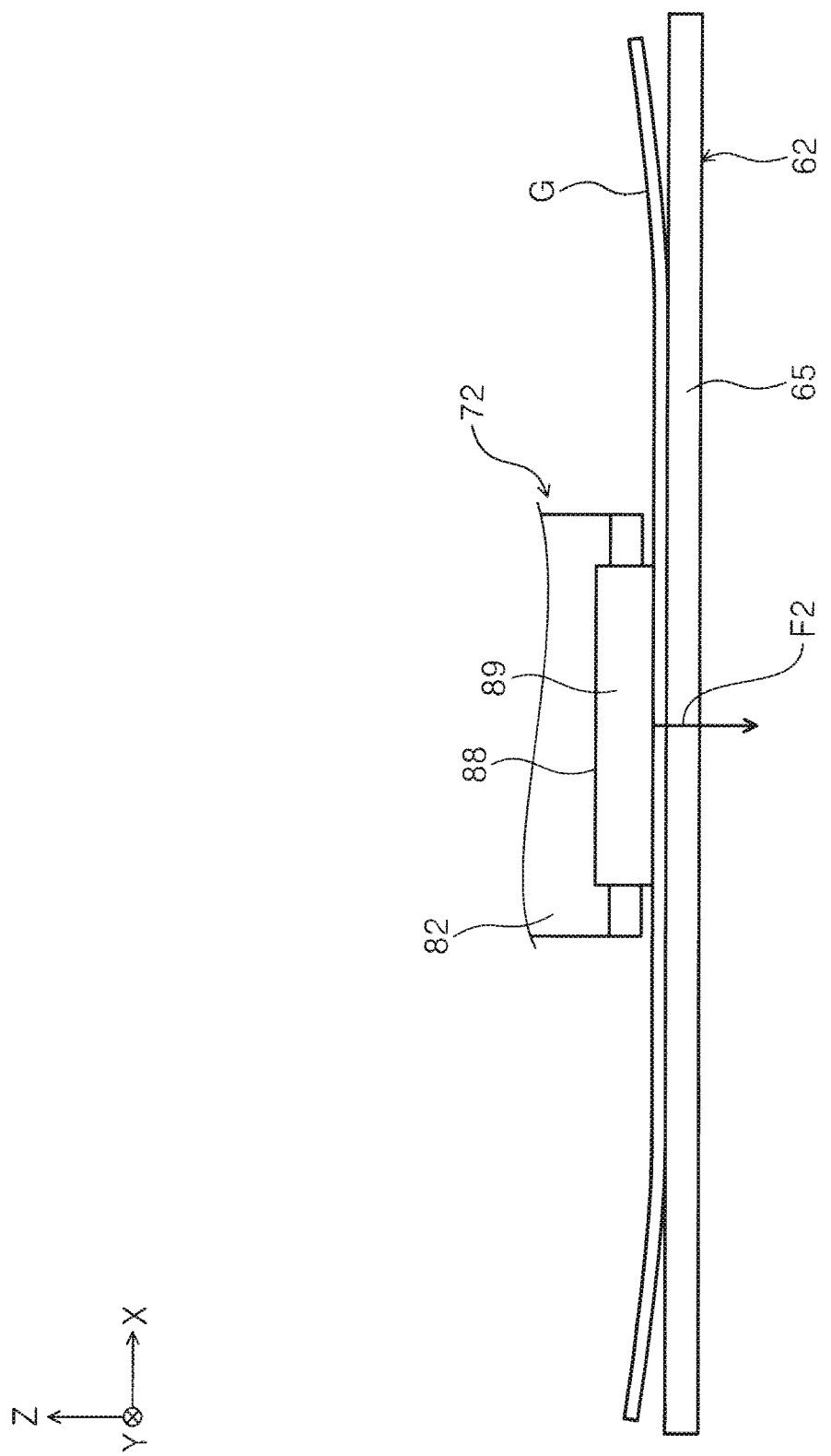
FIG. 7 is a schematic view illustrating a state where the original document pressed by the pressing unit is viewed upstream from downstream in the discharging direction in the scanner according to Exemplary Embodiment 1.

As illustrated in FIG. 7, the central portion in the X direction of the original document G receives the second pressing force F2 of the predetermined magnitude from the rotary member 88. As described above, the original document G receives the first pressing force F1 (FIG. 6) and the second pressing force F2, and thus is corrected to have a shape in which both end portions in the X direction are separated in the +Z direction from the downstream plate portion 65 from the central portion. As a result, a downstream end portion in a traveling direction of the original document G is prevented from being hung in the −Z direction due to an action of self-weight. That is, the downstream end portion in the traveling direction of the original document G can be prevented from entering the supplying port 68 (FIG. 6).

As described above, according to the scanner 10 of Exemplary Embodiment 1, the original document G supported by the paper support 32 is supplied to an inside of the apparatus main body 11 through the supplying port 68. After being read in the reading unit 44, in the supplied original document G, the front and the back are inverted by the inverting unit 36. The original document G, in which the front and the back are inverted, is discharged from the discharging unit 48, and thus is placed on the placement plate 62.

Here, when, a downstream portion in the +A direction of the original document G is deformed so as to hang due to self-weight in the placement plate 62, the pressing unit 72 presses the downstream portion toward the placement plate 62 before the downstream portion protrudes from the placement plate 62. As a result, posture of the original document G is corrected so that a deformation amount due to the self-weight of the downstream portion decreases, and the downstream portion moves away from the supplying port 68, so even when a portion of the original document G protrudes from the placement plate 62, it is possible to prevent the original document G from entering the supplying port 68.

According to the scanner 10, the upper surface 64 is positioned downstream in the +A direction and above in the +Z direction with respect to the inclined surface 66. Here, in the placement plate 62, the posture of the original document G is inclined posture facing upward in the +Z direction toward downstream in the +A direction due to the first angle 81 being greater than the second angle 82. Accordingly, since the original document G is separated from the supplying port 68, it is possible to prevent the downstream end portion of the original document G protruding from the placement plate 62 from entering the supplying port 68.

According to the scanner 10, compared to a configuration in which the original document G is pressed using a member extending in a direction intersecting the +A direction, a contact area in the +A direction of the pressing unit 72 and the original document G can be increased, and thus the posture of the original document G is easily corrected. According to the scanner 10, the upstream end portion of the extending member 74 is rotatably coupled to the shaft portion 57, and the extending member 74 is supported by the second discharging roller 56, and thus posture of the extending member 74 is stable. Further, since the extending member 74 is supported by the second discharging roller 56, and the extending member 74 can be disposed at a place near the nipping portion N, so that the original document G discharged from the nipping portion before being placed can be prevented from being deformed in a direction retracted from the placement plate 62.

According to the scanner 10, the extending member 74 is detachably provided at the shaft portion 57, and thus the extension member 74 can be easily replaced. According to the scanner 10, the pressing unit 72 is at a position to press the central portion in the X direction of the original document G, and thus, the original document G can be pressed even when a size in the X direction of the original document G is changed.

According to the scanner 10, when the original document G is moved in the +A direction while the rotary member 88 presses the original document G, the rotary member 88 is rotated. As a result, friction force acting between the original document G and the rotary member 88 is reduced, as compared to a configuration in which the rotary member 88 is not rotated, and thus wear of the original document G can be reduced. According to the scanner 10, a downstream portion in the +A direction from the hinge portion 84 of the pressing unit 72 is rotatable with respect to an upstream portion. As a result, posture of the downstream portion of the pressing unit 72 can be changed, and a contact area between the downstream portion of the pressing unit 72 and the original document G can be increased, and thus the original document G can be curved such that the original document G is not directed toward the supplying port 68.

According to the scanner 10, the contact area between the downstream portion of the pressing unit 72 and the original document G can be increased as compared to a configuration in which posture of the downstream portion in the +A direction from the hinge portion 84 in the pressing unit 72 is different from posture of the downstream end portion of the placement plate 62. According to the scanner 10, in the pressing unit 72, the upstream hinge portion 85 is provided at the upstream portion that is less likely to affect correction of the posture of the original document G, as compared to the downstream portion. Accordingly, when a position of the downstream end portion of the pressing unit 72 is adjusted in the +A direction, by rotating the upstream hinge portion 85, the adjustment can be easily performed. According to the scanner 10, in accordance with operation of closing the opening portion 16 by the paper support 32, the upstream hinge portion 85 is rotated by the paper support 32 contacting the pressing unit 72, and thus the upstream hinge portion 85 need not be manually operated.

Exemplary Embodiment 2

Hereinafter, a scanner 90 of Exemplary Embodiment 2 will be specifically described. Note that, a similar configuration to that of the scanner 10 of Exemplary Embodiment 1 will be given an identical reference numeral and detailed description will be omitted.

Figure 8:
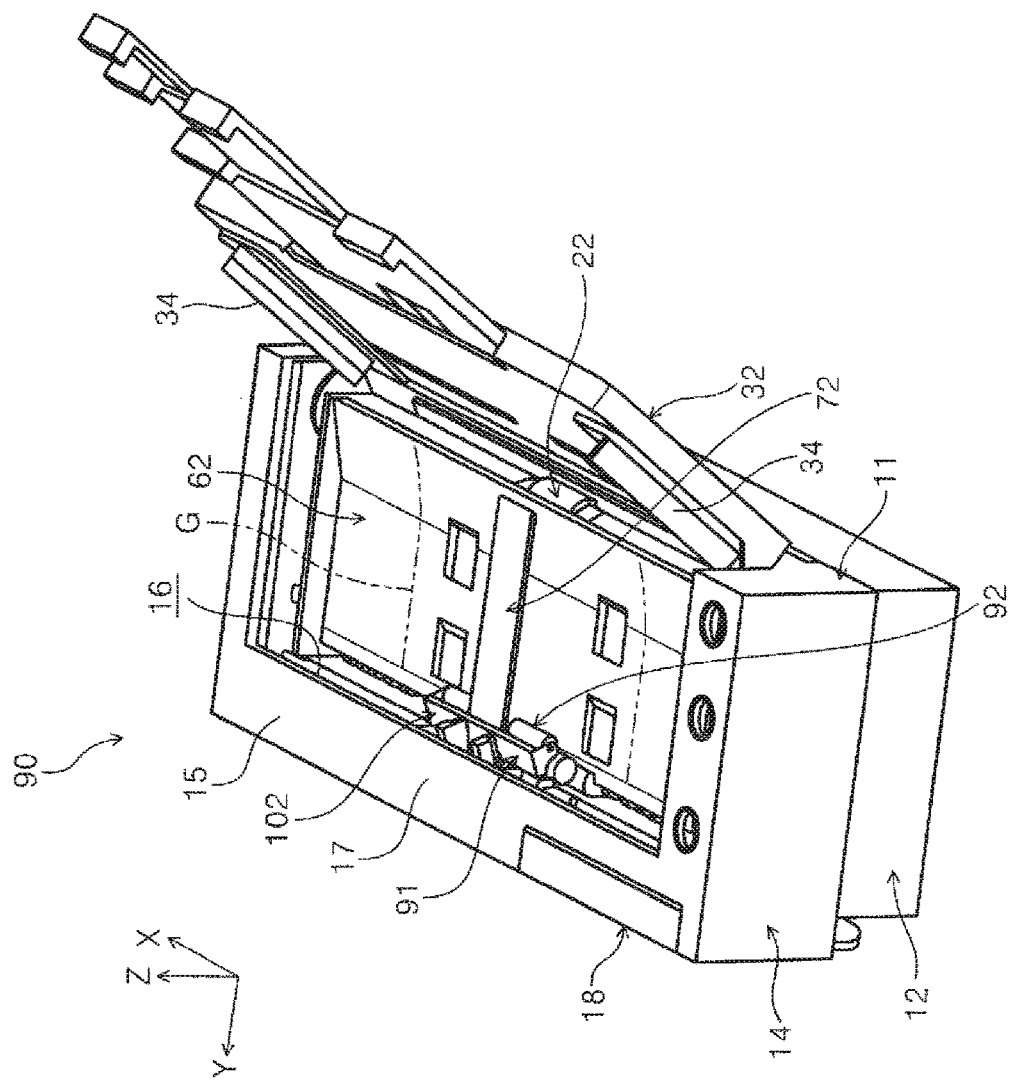
FIG. 8 is a perspective view illustrating an entire scanner according to Exemplary Embodiment 2.

As illustrated in FIG. 8, the scanner 90 is an example of an image reading apparatus that reads the original document G. The scanner 90 differs in configuration from the scanner 10 (FIG. 2) in that a swinging unit 91 is provided, and other configurations are similar to those of the scanner 10. The swinging unit 91 includes an imparting unit 92, and a support holder 102.

Figure 9:
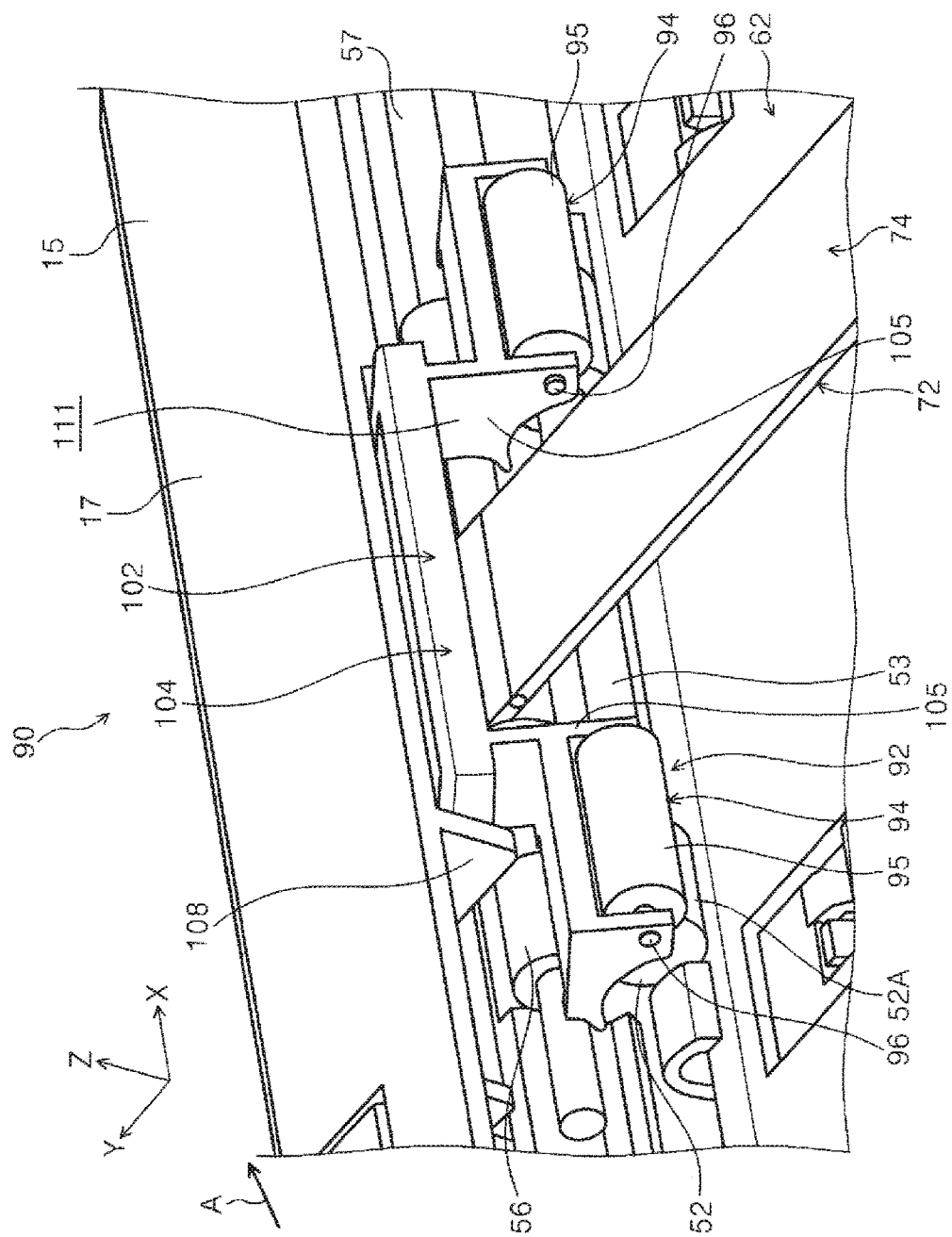
FIG. 9 is a perspective view illustrating a swinging unit and a periphery portion of the swinging unit in the scanner according to Exemplary Embodiment 2.

As illustrated in FIG. 9, the imparting unit 92 is provided downstream in the +A direction with respect to the nipping portion N (FIG. 2). The imparting unit 92 imparts transport force to the original document G. The imparting unit 92 presses the original document G discharged from the nipping portion N toward an outer peripheral surface 52A of the first discharging roller 52. Specifically, the imparting unit 92 includes two driven rollers 94 as an example.

The two driven rollers 94 are an example of driven rotating bodies that rotate along with rotation of the first discharging roller 52. The driven roller 94 includes a cylindrical main body portion 95, and a cylindrical shaft member 96. The shaft member 96 extends in the X axis direction. The main body portion 95 is rotatably provided around the shaft member 96.

Figure 10:
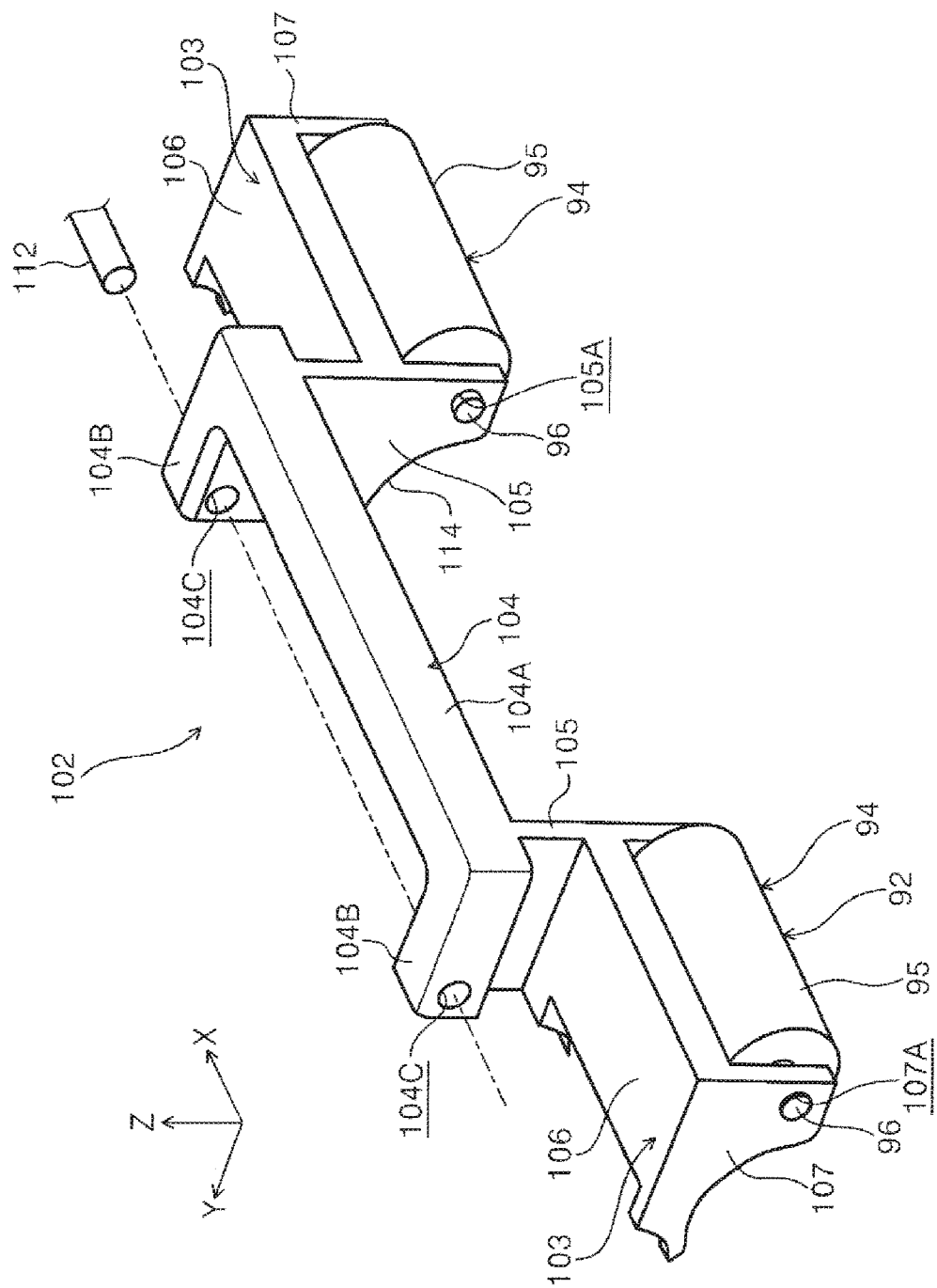
FIG. 10 is a perspective view of a swinging unit in the scanner according to Exemplary Embodiment 2.

As illustrated in FIG. 10, the support holder 102 is an example of a supporting member that supports the imparting unit 92. The support holder 102 is configured to include, as an example, a frame 104, two vertical plates 105, two upper plates 106, and two side plates 107. Note that in the description of the support holder 102, a position of each portion is described assuming that the swinging unit 91 is in a state of being upright in the +Z direction. The support holder 102 is configured such that a site in the +X direction and a site in the −X direction are symmetrical with respect to a virtual plane (not illustrated) passing through a center in the X direction. Therefore, there may be a case where the site in the −X direction of the support holder 102 is described, and the site in the +X direction is denoted by the same reference sign, and description thereof is omitted.

The frame 104 is formed in a U-shape that opens in the +Y direction as viewed from the Z direction. The frame 104 includes a prism-shaped coupling portion 104A extending in the X direction, and prism-shaped mounting portions 104B extending in the +Y direction from both end portions in the X direction of the coupling portion 104A. A mounting hole 104C that penetrates the mounting portion 104B in the X direction is formed at an end portion in the +Y direction of the mounting portion 104B. The mounting hole 104C is formed in a circular shape as viewed from the X direction. The mounting hole 104C has a size that allows insertion of a cylindrical mounting shaft 112.

A vertical plate 105 extends, in the −Z direction, from an end portion in the +X direction of the mounting portion 104B and from a portion of the coupling portion 104A. The vertical plate 105 has a predetermined thickness in the X direction. An end face in the +Y direction of the vertical plate 105 is aligned with an end face in the +Y direction of the mounting portion 104B. An end face in the −Y direction of the vertical plate 105 is aligned with an end face in the −Y direction of the mounting portion 104B. A support hole 105A is formed in the vertical plate 105, at a position in the −Y direction and the −Z direction with respect to a center in the Y direction. The support hole 105A has a size that allows insertion and support of the shaft member 96. A guide surface 114, which will be described later, is formed in the vertical plate 105 at a position in the +Y direction and the −Z direction with respect to the center in the Y direction.

The upper plate 106 extends in the −X direction from substantially a central portion in the Z direction of the vertical plate 105. An end portion in the −Z direction of the upper plate 106 is formed with a guide surface 106A (FIG. 11) that guides the original document G together with the guide surface 114 described later, and a curved surface 106B (FIG. 11) positioned away from the driven roller 94. A spring 109 (FIG. 12) contacts the upper plate 106, thereby imparting elastic force. Sine the elastic force is imparted to the upper plate 106, the driven roller 94 is pressed toward the first discharging roller 52 (FIG. 12). In a state where the original document G is absent, a site where the driven roller 94 contacts the first discharging roller 52 is a downstream nipping portion NP (FIG. 12).

The side plate 107 extends in the −Z direction from an end portion in the −X direction of the upper plate 106. A support hole 107A is formed at the side plate 107, at a position in the −Y direction and the −Z direction with respect to a center in the Y direction. The support hole 107A has a size that allows insertion and support of the shaft member 96. The guide surface 114, which will be described later, is formed at the side plate 107 at a position in the +Y direction and the −Z direction with respect to the center in the Y direction.

Here, a roller support unit 103 is configured by the vertical plate 105, the upper plate 106, and the side plate 107. The shaft member 96 is inserted through the support holes 105A and 107A, and thus is supported by the vertical plate 105 and the side plate 107. Furthermore, the shaft member 96 rotatably supports the main body portion 95. Thus, the driven roller 94 is rotatably supported by the support holder 102.

As illustrated in FIG. 9, the edge portion 17 of the upper wall 15 is provided with a rib 108 protruding in the −Z direction from the upper wall 15. Note that, the two ribs 108 are provided at an interval in the X direction, but illustration of the rib 108 in the +X direction is omitted. A hole portion (not illustrated) is formed in the rib 108.

After the mounting shaft 112 (FIG. 10) is inserted into the mounting hole 104C (FIG. 10) of the support holder 102, the mounting shaft 112 is inserted into a hole portion (not illustrated) in the rib 108. Thus, the swinging unit 91 is provided so as to be swingable with respect to the upper wall 15 about the mounting shaft 112. The support holder 102 is removed from the upper wall 15 by performing an inverted procedure to the procedure described above. In other words, the support holder 102 is detachably provided at the apparatus main body 11 (FIG. 1).

The support holder 102 includes a space portion 111 that is formed of a portion of the frame 104 and the two vertical plates 105. The space portion 111 is opened at least in the −Y direction and the −Z direction. Since the space portion 111 is formed, when the extending member 74 is rotated or bent within a predetermined range, contact with the support holder 102 is suppressed.

Figure 11:
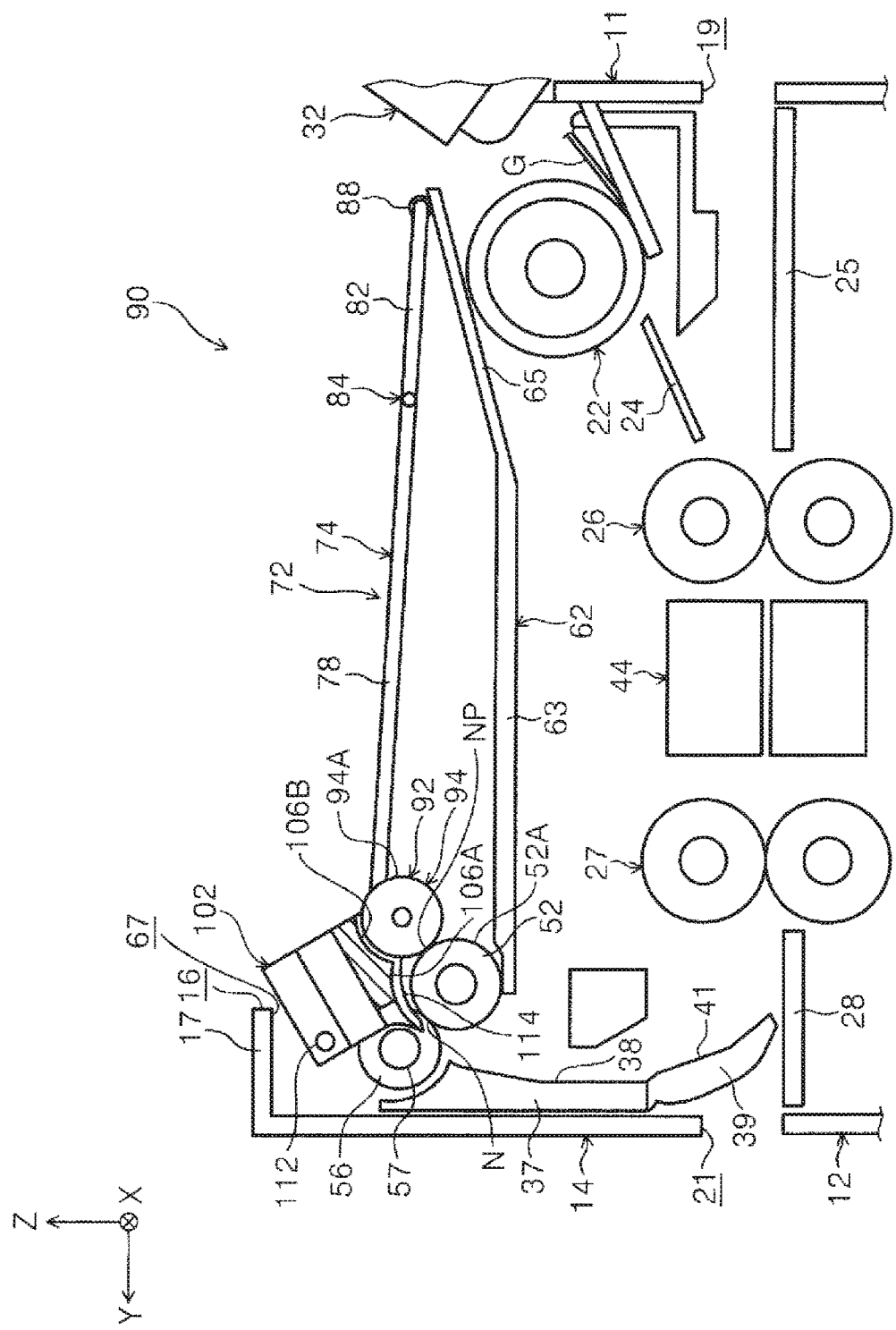
FIG. 11 is a schematic view of the scanner according to Exemplary Embodiment 2 as viewed from one side in a width direction.
Figure 12:
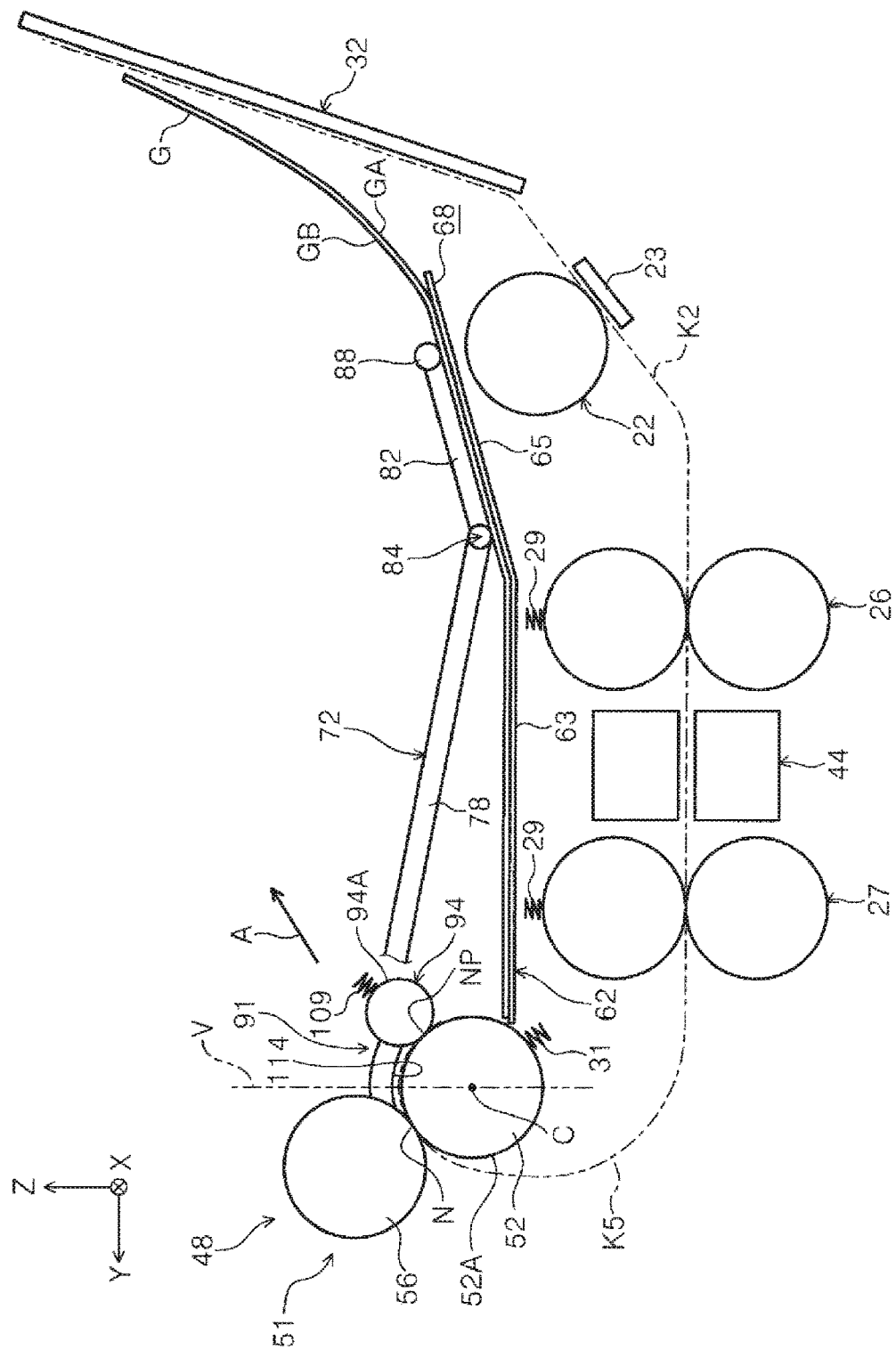
FIG. 12 is a schematic view illustrating a state where an original document discharged from a transport path is pressed by the swinging unit and a pressing unit in the scanner according to Exemplary Embodiment 2.

As illustrated in FIG. 11, the support holder 102 is provided with the guide surface 114. The guide surface 114 is a surface that guides the original document G discharged from the nipping portion N to between the driven roller 94 and the outer peripheral surface 52A of the first discharging roller 52. The guide surface 114 is a surface formed in an arc shape that is convex in the +Z direction as viewed in the +X direction.

Additionally, the guide surface 114 extends toward an outer peripheral surface 94A of the driven roller 94 from between the nipping portion N and the shaft portion 57, as viewed in the +X direction. Note that, the guide surface 114 is positioned upstream the downstream nipping portion NP in a direction in which the original document G after discharging travels.

As illustrated in FIG. 12, a center of rotation of the first discharging roller 52 is represented by a point C. Also, a line extending in the Z direction through the point C is a virtual line V. In the outer peripheral surface 52A, the nipping portion N is positioned in the +Y direction with respect to the virtual line V. The downstream nipping portion NP is positioned in the −Y direction with respect to the virtual line V. In other words, the nipping portion N is at a position in the +Y direction and the +Z direction with respect to the point C. The downstream nipping portion NP is at a position in the −Y direction and the +Z direction with respect to the point C.

Next, actions of the scanner 90 of Exemplary Embodiment 2 will be described. Note that, configurations and actions similar to those of the scanner 10 (FIG. 1) will not be basically described. As illustrated in FIG. 12, after being read by the reading unit 44, the original document G is transported along the fifth path K5, and is discharged from the nipping portion N in the +A direction. Then, the original document G is guided by the guide surface 114 by contacting the guide surface 114, contacts the outer peripheral surface 94A, and then enters the downstream nipping portion NP.

In the downstream nipping portion NP, in addition to a load including a component of self-weight of the swinging unit 91, pressing force from the driven roller 94 acts on the original document G. Here, reaction force of friction force generated on the original document G by the pressing force serves as transport force that transports the original document G downstream, that is, toward the placement plate 62.

As a result, the original document G placed on the outer peripheral surface 52A downstream the nipping portion N is further transported downstream, and thus an upstream end portion in the +A direction of the original document G discharged from the nipping portion N can be prevented from remaining between the nipping portion N on the outer peripheral surface 52A and the downstream nipping portion NP. The original document G transported to the placement plate 62 is corrected by being pressed by the pressing unit 72 in the same manner as in Exemplary Embodiment 1.

Note that, the swinging unit 91 is swingable in the scanner 90. Thus, for example, when the original document G made from paper thicker than plain paper goes into the downstream nipping portion NP, the driven roller 94 in a state of contacting the original document G is displaced in the +Z direction. As a result, it is possible to prevent frictional force more than necessary from acting on the original document G, at the downstream nipping portion NP.

As described above, according to the scanner 90 of Exemplary Embodiment 2, pressing force acts on the original document G discharged from the nipping portion N toward the outer peripheral surface 52A from the imparting unit 92. Then, reaction force to friction force generated in accordance with the pressing force is imparted to the original document G as transport force. In this way, even when the transport force of the original document G is reduced by being discharged from the nipping portion N, the original document G is continuously transported by the transport force imparted by the imparting unit 92, and thus the original document G can be prevented from remaining in the discharging roller pair 51.

According to the scanner 90, the imparting unit 92 and the guide surface 114 are provided at the support holder 102, and a relative position shift between a position of the imparting unit 92 and a position of the guide surface 114 is suppressed, and thus the original document G discharged from the nipping portion N can be easily guided between the imparting unit 92 and the outer peripheral surface 52A. According to the scanner 90, the support holder 102 is detachably provided at the apparatus main body 11, and thus replacement and cleaning of the support holder 102 and the imparting unit 92 can be easily performed. According to the scanner 90, since the driven roller 94 is included, it is possible to prevent excessive friction force from acting on the original document G, while ensuring transport force, as compared to a configuration in which the imparting unit 92 does not rotate.

Other Modified Examples

Although the scanners 10 and 90 according to Exemplary Embodiments 1 and 2 of the present disclosure basically have the configurations described above, of course, it is possible to change, omit, or combine a partial configuration within a range that does not deviate from the gist of the present disclosure.

In the scanner 10, the placement plate 62 is not limited to have the upper surface 64 and the inclined surface 66, and may include only one of the upper surface 64 and the inclined surface 66. A block-shaped mounting table may be used instead of the placement plate 62. The extending member 74 is not limited to extend in the Y direction, and may extend in the X direction to press the original document G against the placement plate 62. The extending member 74 is not limited to be rotatably coupled to the shaft portion 57, and may be rotatably coupled to the edge portion 17. The extending member 74 need not be detached from the shaft portion 57.

The pressing unit 72 may press both ends in the X direction of the original document G. The pressing unit 72 need not include the rotary member 88. The pressing unit 72 need not include the hinge portion 84. Further, the number of the hinge portions 84 is not limited to two, and may be one or more than three. The pressing unit 72 may include a hinge portion, or posture of the downstream portion in the +A direction need not be aligned with posture of the downstream end portion of the placement plate 62. In the hinge portion 84, the upstream hinge portion 85 may be absent. The paper support 32 and the pressing unit 72 need not contact when the paper support 32 closes the opening portion 16.

In the scanner 90, the guide surface 114 need not be provided at a member that supports the driven roller 94. That is, the guide surface 114 may be provided at a separate member from the driven roller 94. The support holder 102 need not be capable of being detached from the apparatus main body 11. A pad that generates friction force on the original document G may be used without using the driven roller 94. That is, the imparting unit 92 may impart transport force to the original document G using a member that does not rotate.

The paper support 32 is not limited to open and close with respect to the apparatus main body 11, and may be attached to or detached from the apparatus main body 11. The scanners 10 and 90 need not include the first path K1 and the fourth path K4, that is, may include only an inversion path.

What is claimed is:

1. An image reading apparatus, comprising:
an original document support portion configured to support an original document and guide the original document to a supplying port of an apparatus main body;
an inverting unit configured to invert a front and a back of the original document supplied through the supplying port;
a reading unit configured to read the original document before being inverted by the inverting unit;
a discharging unit configured to discharge the original document after being inverted by the inverting unit;
a placement portion on which a portion of the original document discharged in a discharging direction from the discharging unit is placed; and
a presser configured to press the original document toward the placement portion at least at a downstream end portion in the discharging direction of the placement portion.

2. The image reading apparatus according to claim 1, wherein
the placement portion includes a first placement surface and a second placement surface on which the original document is placed,
the first placement surface is positioned downstream in the discharging direction and above in a vertical direction with respect to the second placement surface, and
a first angle formed by the first placement surface and a horizontal direction is greater than a second angle formed by the second placement surface and the horizontal direction.

3. The image reading apparatus according to claim 1, wherein
the presser includes an extending member extending along the discharging direction, and
a downstream end portion in the discharging direction of the extending member presses the original document.

4. The image reading apparatus according to claim 3, wherein
the discharging unit includes
a discharging roller pair formed by
a first discharging roller rotated about an axis along a width direction intersecting the discharge direction of the original document, and
a second discharging roller including a shaft portion positioned opposite to the placement portion with respect to the first discharging roller, and forming a nipping portion for nipping the original document together with the first discharging roller, and
an upstream end portion in the discharging direction of the extending member is rotatably coupled to the shaft portion of the second discharging roller.

5. The image reading apparatus according to claim 4, wherein
the extending member is detachably provided at the shaft portion.

6. The image reading apparatus according to claim 4, wherein
the discharging unit includes the two discharging roller pairs positioned on one side and another side with respect to a center in the width direction of the original document, and
the presser presses a central portion in the width direction of the original document.

7. The image reading apparatus according to claim 4, comprising:
- an imparting unit provided downstream in the discharging direction with respect to the nipping portion, and configured to impart transport force to the original document, wherein
- the imparting unit presses the original document discharged from the nipping portion toward an outer peripheral surface of the first discharging roller.

8. The image reading apparatus according to claim 7, comprising:
- a supporting member configured to support the imparting unit, wherein
- the supporting member is provided with a guide surface for guiding the original document discharged from the nipping portion to between the imparting unit and the outer peripheral surface.

9. The image reading apparatus according to claim 8, wherein
- the supporting member is detachably provided at the apparatus main body.

10. The image reading apparatus according to claim 8, wherein
- the imparting unit includes a driven rotating body rotatably supported by the supporting member, and rotating along with rotation of the first discharging roller.

11. The image reading apparatus according to claim 1, wherein
- the presser includes a rotating body contacting the original document, and rotating along with movement of the original document.

12. The image reading apparatus according to claim 1, wherein
- the presser includes at least one hinge portion rotating about an axis along a width direction intersecting the discharging direction of the original document.

13. The image reading apparatus according to claim 12, wherein
- the hinge portion is rotatably provided such that posture of a downstream portion in the discharging direction in the presser is aligned with posture of the downstream end portion of the placement portion.

14. The image reading apparatus according to claim 12, wherein
- the hinge portion includes an upstream hinge portion provided at an upstream portion from a center in the discharging direction of the presser.

15. The image reading apparatus according to claim 14, wherein
- the apparatus main body is provided with an opening portion exposing the placement portion,
- the original document support portion is provided at the apparatus main body while being configured to open and close the opening portion, and
- the upstream hinge portion is rotated by the original document support portion contacting the presser, when the original document support portion closes the opening portion.

* * * * *